United States Patent [19]
Melanson

[11] 3,858,340
[45] Jan. 7, 1975

[54] PICTURE HOLDER

[76] Inventor: Walter E. Melanson, 33 Boynton St., Boston, Mass. 02130

[22] Filed: Jan. 21, 1974

[21] Appl. No.: 434,809

Related U.S. Application Data

[63] Continuation of Ser. No. 238,366, March 27, 1972, abandoned.

[52] U.S. Cl. .................. 40/68, 40/78, 40/104.02, 40/158 B
[51] Int. Cl. .......................................... G09f 11/02
[58] Field of Search .............. 40/67, 68, 78, 104.03, 40/104.02, 106.1, 156, 158 R, 158 B

[56] References Cited
UNITED STATES PATENTS

| | | | |
|---|---|---|---|
| 286,736 | 10/1883 | Shepard | 40/68 X |
| 2,586,176 | 2/1952 | Olsen | 40/156 X |
| 2,779,116 | 1/1957 | Smith | 40/106.1 |
| 2,994,298 | 8/1961 | Thomas | 40/67 X |
| 3,000,113 | 9/1961 | Olson | 40/104.03 X |
| 3,445,151 | 5/1969 | Stefankis | 40/156 X |
| 3,466,126 | 9/1969 | Sakamoto | 40/124 X |
| 3,503,496 | 3/1970 | Kovarik | 40/67 X |

*Primary Examiner*—John H. Wolff
*Attorney, Agent, or Firm*—Richard F. Benway

[57] ABSTRACT

A photographic picture holder which permits one to accumulate several photographs, store them while taking additional photos and be able to inspect each photo while they are developing.

1 Claim, 4 Drawing Figures

Patented Jan. 7, 1975
3,858,340
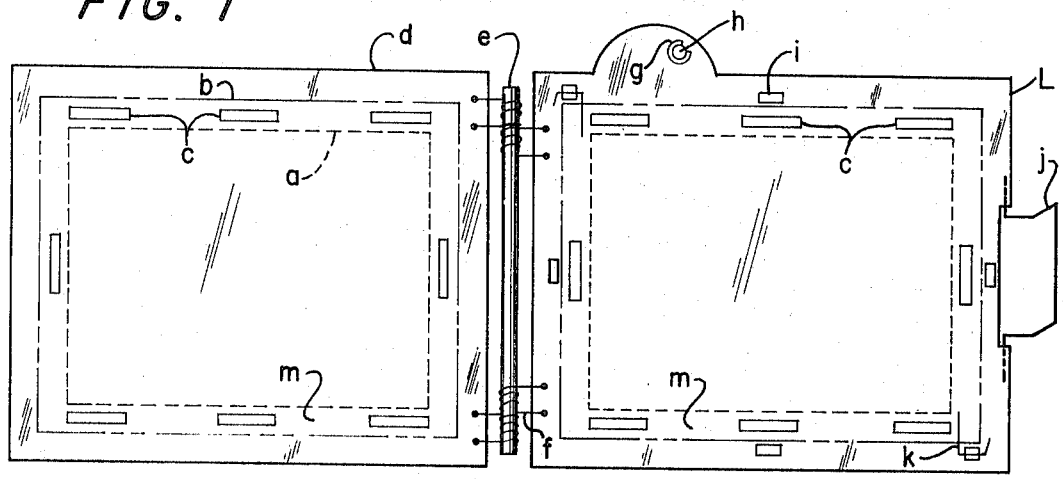
FIG. 1
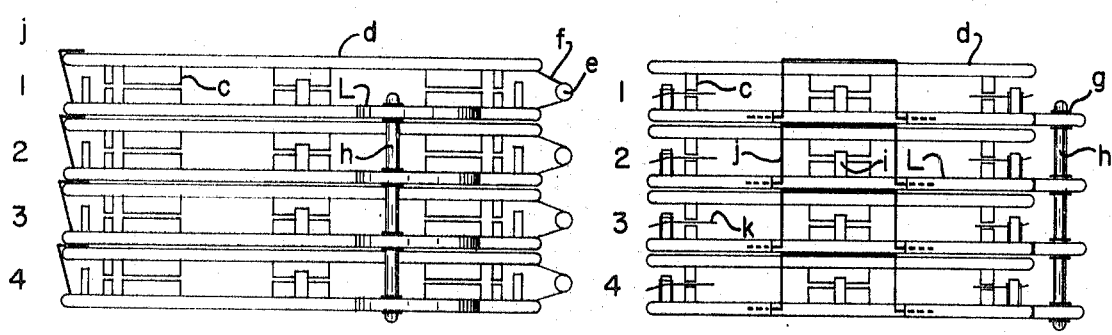
FIG. 2
FIG. 3
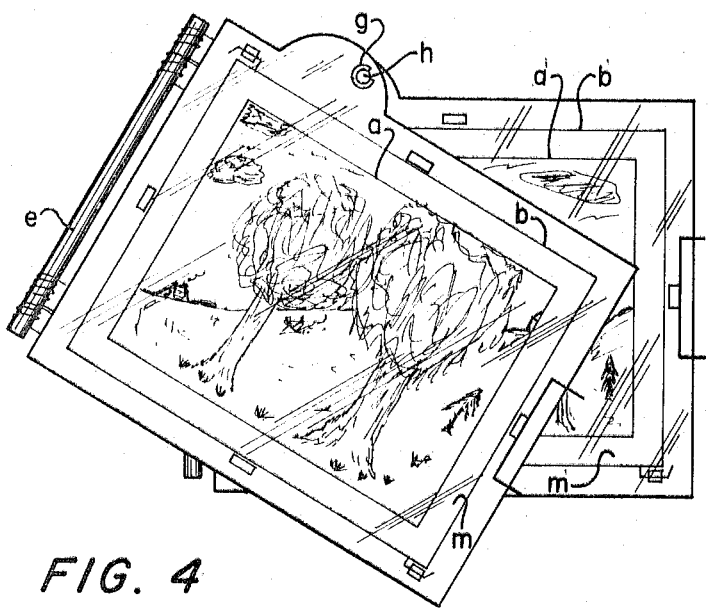
FIG. 4

PICTURE HOLDER

This is a continuation of patent application Ser. No. 238,366, filed Mar. 27, 1972, which has been abandoned.

This invention relates to photographic pictures which are developed in accordance with the very popular Polaroid type camera. The pictures produced by Polaroid cameras are a peculiar quality. The picture requires additional time after it has been shot and processed within the camera to fully develop. The black and white picture requires time for a special coating to harden before it is touched otherwise the picture recorded on the film will be smeared or disturbed. So too with color photographs the plastic material bearing the photo impression must harden over a period of time before it is allowed to be touched or again the picture can be destroyed. The present invention permits one to store these pictures in tandem while they are continuing to develop and until such time as they are fully hardened preventing their touching and thereby their subsequent damage.

The present inventor has discovered that if he were able to hold one picture while it developed, he could continue to take additional photographs and compare his first shot with subsequent shots as he took them in order to determine whether it is worthwhile to continue taking shots or if it is even necessary to so continue. He, therefore, discovered to be consistent with the presently available state of the art camera which has eight potential shots per packet of film, he must therefore be able to store eight separate pictures while they are drying and must have them available for examination in comparison with fresh shots so that he is able to determine whether the need for continuing or the need for additional shots of a particular subject matter is required. The present invention therefore could extend the utility and enjoyability of the Polaroid camera by providing the means to hold the separate pictures apart while they are drying yet be available for inspection at all times.

Therefore, an object of the present invention is to provide a means for holding Polaroid pictures apart while they are drying.

Another object of the present invention is to provide means for holding Polaroid pictures while they are drying in such a manner that they can be examined and compared with subsequent photographs.

other objects, advantages, and features of the present invention will be better understood from the following detailed specifications especially when read in conjunction with the attached drawings of which:

FIG. 1 is a view of the present invention.
FIG. 2 is a top view of the present invention.
FIG. 3 is a side view of the present invention.
FIG. 4 is a top view of the present invention showing the photographs in a position for examination.

Referring to FIG. 1 we see a picture holder in two parts $d$ and $l$ which swing about a pivot axis $e$. The picture holder therefore can hold a picture on the left and another picture on the right hand side of the holder. A picture of the usual Polaroid type is shown in phanthom dotted lines. The actual picture has a dimension as shown by the border $b$; however, the actual picture and area of interest is designated by the dotted line $a$ which encloses the area containing a sensitized material which must dry and harden and kept away from other objects while it continues to develop. Therefore, between the outside perimeter $b$ and inside perimeter $a$ a border $m$ is formed. This border area is not sensitive to physical contact. Accordingly, the holder $d$ has raised portions $c$ distributed over its surface. These raised portions come in contact with the perimeter or border $m$ thereby keeping the photograph out of contact with the sides of the holder.

The first picture is placed on the right side of FIG. 1 face down and another picture is placed on the other side face down. It will be observed also that clips $k$ are provided on the right hand side only whereby the first photograph that is taken is placed under these clips and held in position. On the other hand when the other side $d$ has a picture placed on it and the cap is brought down and the cover closed, it is held in place without clips when the unit is closed, the holder being transparent one is able to observe the photograph while it is drying and thereby one can take a photograph, install it in the holder, examine it, put it back, take another photograph, re-examine the first photograph in the holder, and compare it with the second photograph thereby enabling one to fully exploit the advantages of instant review of photographs.

Referring to FIG. 1 again, we see that two individual plates are separated by an axis rod $e$ about which is wound a pivot spring $f$, two for each plate whereby the unit can be opened to insert two photographs facing opposite one another and then closed so that $j$, a clamp, clamps the two plates $d$ and $l$ together and holds them closed.

A tab portion having a hole in it is shown as $g$ on one plate $l$ of a given set of plates and a hole with its axis of rotation $h$ installed in it. Its operation is better understood by an examination of FIG. 2. We see $d$ and $l$ of a given unit closed which forms the first tier of the photo holder. We see the hinges $f$ about their pivot axis rod $e$. We also see the raised portion $c$ and a side view of the clamp $j$, which holds two individual plates of the holder together forming a holder for two photographs. We note further the pivot axis $h$ whereby four units 1, 2, 3, and 4 consisting of two plates clamped together can rotate with reference to one another so that each unit can be opened two photographs inserted, and closed to be returned to its original position.

Referring now to FIG. 3 we see a second view of the photo holder. Here we note again the clamps $j$ together with the top and bottom of an individual photo holder $d$ and $l$ and further the raised portions $c$ together with clips $k$ to hold one of the two photographs in place while the holder is open. We also see the pivot $h$ about which the four individual units rotate. We also note a locking ring $g$ which holds the individual unit to the pivot point $h$. The pivot rod $h$ is made of metal and so too with the ring $g$. The four plastic holder units all being identical can rotate and form a four-tiered photographic holder storing two photographs per unit.

Referring now to FIG. 4 we see a photographic holder, at least two tiers of it, in a better position. A photo $a$ in one tier can be rotated with respect to the other tiers whereby a second photograph $a$ can be viewed. When one wishes to insert a photograph, he can open the first tier without rotating the units with respect for one another. After he has inserted the second tier out he must rotate it with respect to the first one whereby he then opens the clamp and parts the two plates of a tiered holder and places the photograph in each of these, closing it and returning it to its original position unless and until he wishes to inspect the photographs again. After he has filled the entire unit, he merely has to wait a short while until all of the photographs have fully developed. By changing cartridges in the Polaroid camera, which usually contains eight photographs, the drying time or curing time for the chemicals which form the photographic images will have elapsed and no damage will come to the photographs because of physical contact. In black and white photographs each photo is covered with a plastic material which prevents the sensitized black and white image from being scratched off. This requires time but each photo is coated before it is inserted into the holder. With the color photographs plastic material is not coated but it requires curing time and it is inserted directly into the holder from the camera permitting it to cure.

The materials of the present invention are chiefly a simple transparent plastic. Raised portion $c$ and clips $j$ can be plastic also. Pivot rod $h$ and ring $g$ along with rod $e$ together with its hinge $f$ should be made out of metal.

I have disclosed my invention with reference to particular apparatus and obviously those skilled in the art may make substitutions and variations without departing from its true scope and spirit. I therefore only wish to be limited in my invention by the appended claims.

I claim:

1. A photographic holder in combination with exposed photographic paper sensitized on one side within the confines of a border extending along the perimeter of said paper undergoing development comprising, a plurality of transparent rectangular solid plate members, clip means for holding developing photograph paper in spaced relation against a plate member of a cooperating pair of plate members, said plate members having raised portions equally spaced along the perimeter extending normal to each said plate for engaging the border of said papers undergoing development, hinge means for interconnecting adjacent edges of said cooperating pairs of plate members (so that) with said raised portion (are) in registration with each other whereby cooperating plate members may be opened and closed so that two developing photographic papers may be placed back to back to each other and held between said raised portions when said pair are hingedly closed, clamp means for holding (said) each pair of plate members together, one of (said) each plate member pair having extension means in the plane of the plate member with a hole therethrough normal to said plate member, and pivot means extending through the holes of a group of cooperating pairs of plate members whereby any pair may be (seperated from and returned to) selectively rotated about the remaining pairs of the group at will for receiving two developing photographic papers and inspection of developing papers previously placed therein.

* * * * *